(12) United States Patent
Busetti et al.

(10) Patent No.: US 10,619,481 B2
(45) Date of Patent: Apr. 14, 2020

(54) MICROMECHANICAL ELASTIC PROPERTIES SOLVER

(71) Applicant: CONOCOPHILLIPS COMPANY, Houston, TX (US)

(72) Inventors: Seth Busetti, Houston, TX (US); Zijun Fang, Houston, TX (US); David V. Amendt, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 629 days.

(21) Appl. No.: 15/216,278

(22) Filed: Jul. 21, 2016

(65) Prior Publication Data

US 2017/0022808 A1    Jan. 26, 2017

Related U.S. Application Data

(60) Provisional application No. 62/195,629, filed on Jul. 22, 2015.

(51) Int. Cl.
*G01V 1/40* (2006.01)
*E21B 49/08* (2006.01)
*G01V 11/00* (2006.01)
*G01V 99/00* (2009.01)

(52) U.S. Cl.
CPC ............ *E21B 49/087* (2013.01); *G01V 11/00* (2013.01); *G01V 99/005* (2013.01); *G01V 2210/62* (2013.01); *G01V 2210/624* (2013.01); *G01V 2210/6242* (2013.01)

(58) Field of Classification Search
CPC .... E21B 49/087; G01V 11/00; G01V 99/005; G01V 2210/62; G01V 2210/624; G01V 2210/6242

USPC .......................................................... 702/11
See application file for complete search history.

(56) References Cited

U.S. PATENT DOCUMENTS

| | | | |
|---|---|---|---|
| 2008/0086287 A1 | 4/2008 | Xu et al. | |
| 2010/0312534 A1* | 12/2010 | Xu ........................... | G01V 1/50 703/2 |
| 2011/0022320 A1* | 1/2011 | Abousleiman ........ | E21B 49/006 702/12 |
| 2011/0208431 A1 | 8/2011 | Skelt | |
| 2014/0352949 A1 | 12/2014 | Amendt et al. | |

(Continued)

FOREIGN PATENT DOCUMENTS

WO    2009108432    9/2009

OTHER PUBLICATIONS

Budianksy, B. (1965), On the elastic moduli of some heterogeneous materials, J. Mech. Phys. Solids, vol. 13, 223-227.

(Continued)

*Primary Examiner* — Toan M Le
*Assistant Examiner* — Xiuqin Sun
(74) *Attorney, Agent, or Firm* — Polsinelli PC

(57) ABSTRACT

This disclosure describes a novel method for predicting continuous wellbore mechanical properties such as static elastic stiffness and failure strength, where the properties solutions are deterministic and based on mechanical theory. It has at least three immediate applications: (a) continuous plots of mechanical properties vs. depth, (b) conceptual testing of the effect of changing constituent volume fractions, (c) ternary plots.

20 Claims, 5 Drawing Sheets

(56) References Cited

U.S. PATENT DOCUMENTS

2014/0373616 A1* 12/2014 Amendt ................. E21B 47/00
                                                                    73/152.01

OTHER PUBLICATIONS

Hashin, Z. (1962), The elastic moduli of heterogeneous materials, ASME J. Appl. Mech., vol. 29, 143-150.
Hashin, Z. and Shtrikman, S. (1963), A Variational approach to the theory of the elastic behavior of multiphase materials, J. Mech. Phys. Solids, vol. 11, 127-140.
Hashin, Z. (1968), Assessment of the self-consistent scheme approximation, J. Compos. Mater., vol. 2, 284-300.
Hill, R. (1965), A self-consistent mechanics of composite materials, J. Mech. Phys. Solids, vol. 13, 213-222.
Mori, T., and Tanaka, K. (1973), Average stress in matrix and average elastic energy of materials with misfitting Inclusions, Acta Met., vol. 21, 571-574.
Sayar, P., et al., Effective medium modeling of velocity dispersion and attenuation in isotropic rocks, Geophysics, vol. 82, No. 2, p. D135-D156 (Mar.-Apr. 2017).
International Search Report for related application, App. No. PCT/US2016/043370, dated Oct. 7, 2016.

* cited by examiner

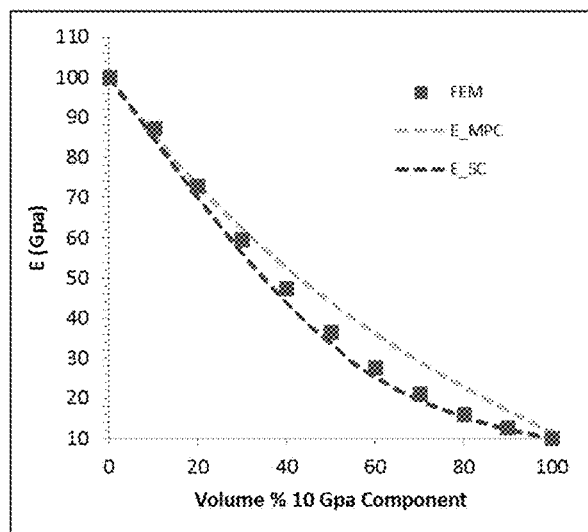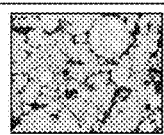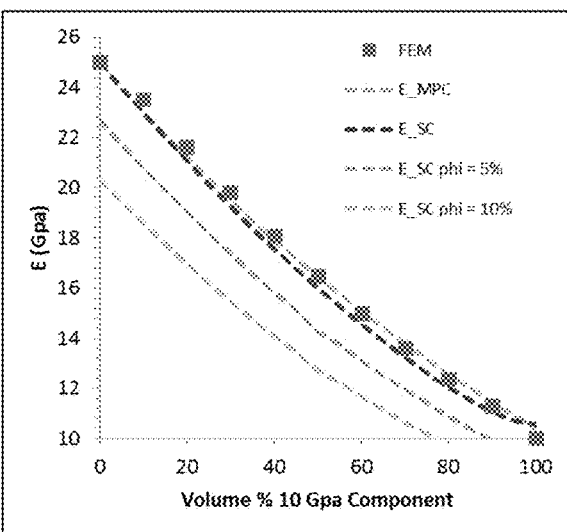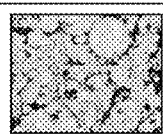
FIGURE 2A　　　　　　　　　　　FIGURE 2B

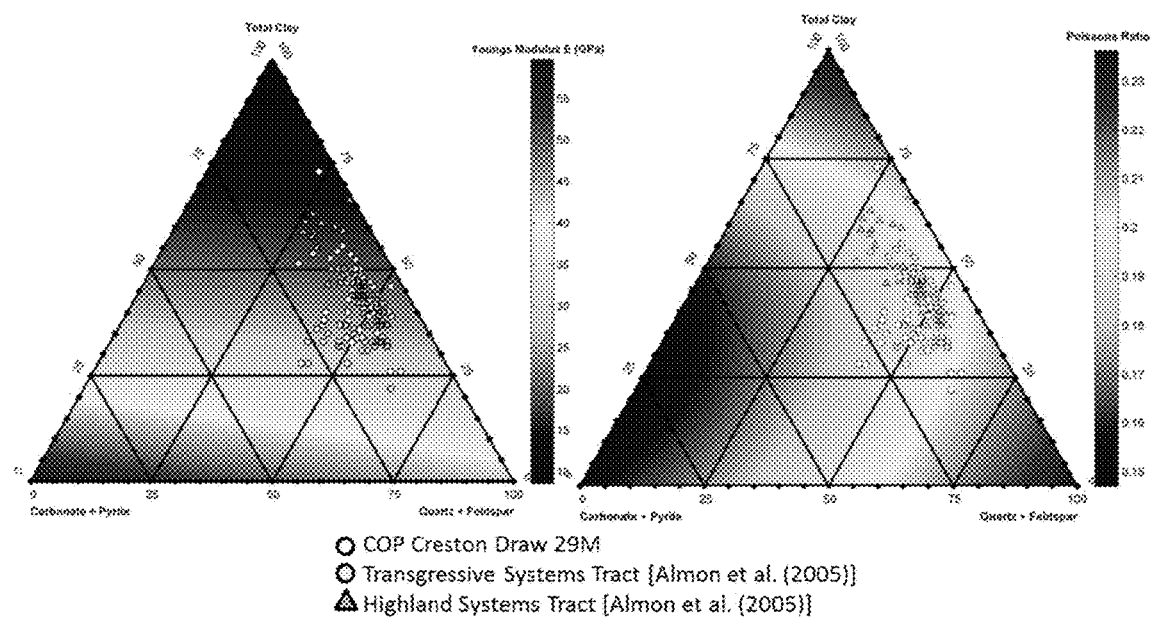
FIGURE 4A
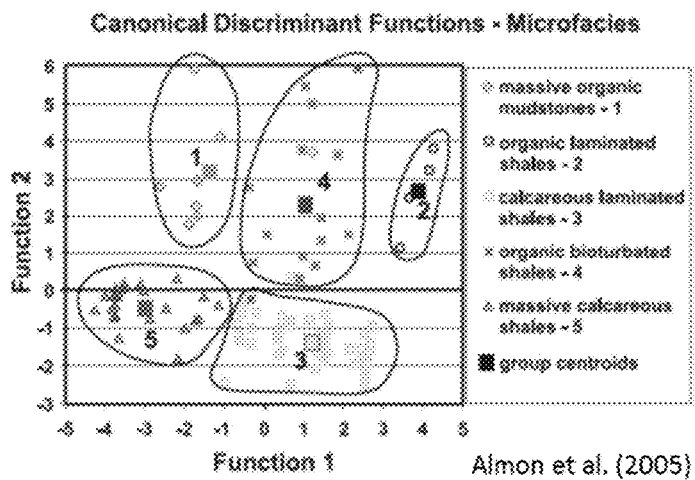
FIGURE 4B
| Microfacies | Bulk Density (g/cm³) | Compressional Wave Velocity (ft/s) | Shear Velocity (ft/s) | Poisson Ratio | Young's Modulus | Shear Modulus |
|---|---|---|---|---|---|---|
| 1 | 2.52–2.55 | 14,400–15,100 | 8070–9300 | 0.145–0.275 | 5.60–7.22 | 2.20–3.03 |
| 2 | 2.47–2.58 | 13,700–15,200 | 7630–10,000 | 0.114–0.273 | 5.02–7.92 | 2.20–3.03 |
| 3 | 2.15–2.26 | 11,000–13,400 | 6370–7080 | 0.198–0.320 | 2.57–4.10 | 1.19–1.63 |
| 4 | 2.18–2.31 | 13,600–15,400 | 6480–8260 | 0.264–0.350 | 4.07–6.03 | 1.51–2.32 |
| 5 | 2.18–2.25 | 13,700–13,900 | 6810–7560 | 0.281–0.272 | 3.86–4.98 | 1.44–1.96 |
FIGURE 4C

MICROMECHANICAL ELASTIC PROPERTIES SOLVER

PRIOR RELATED APPLICATIONS

This application is a non-provisional application which claims benefit under 35 USC § 119(e) to U.S. Provisional Application Ser. No. 62/195,629 filed Jul. 22, 2015, entitled "MICROMECHANICAL ELASTIC PROPERTIES SOLVER," which is incorporated herein in its entirety.

FIELD OF THE DISCLOSURE

The disclosure generally relates to a method of estimating the elastic properties of rock formation, and more particularly to a method implementing micromechanical approach to estimate the elastic properties of subterranean formation along a wellbore from mineralogy data.

BACKGROUND OF THE DISCLOSURE

Industry practice commonly relies on dynamic sonic-based data to solve for the elastic moduli, which must be converted to static (rock mechanics-based) moduli using empirical dynamic-static transforms. Examples include the method described in WO2009108432.

Despite success in conventional reservoirs, the sonic-based approach has not been accurate or reliable on many non-conventional rock layers, such as shale, mudstone or marl, which are strongly heterogeneous and exhibit ductile behavior. Research has been published attempting to empirically correlate mineralogy to mechanical properties for different rock formation, but have been less than satisfactory. A common intensive rock mechanics analysis is to test numerous rock samples in the laboratory and to study their mechanical variations. However, this approach is not possible in reservoir settings where physical sampling is scarce. A common petrophysical application is to cross-plot dynamic elastic properties versus porosity or some other rock parameter to derive empirical relationships for the field. Micromechanical techniques are often employed in petrophysical applications for two-phase composites, such as solid and pore-space.

In continuum mechanics, the term Eshelby's inclusion problems refers to a set of problems involving ellipsoidal elastic inclusions in an infinite elastic body. An "inclusion" is a region in an infinite homogeneous isotropic elastic medium undergoing a change of shape and size which, but for the constraint imposed by its surroundings (the "matrix"), would be arbitrary homogeneous strain. Analytical solutions to these problems were first devised by John D. Eshelby in 1957. Eshelby found that the resulting elastic field can be found using a "sequence of imaginary cutting, straining and welding operations." Eshelby's finding that the strain and stress field inside the ellipsoidal inclusion is uniform and has a closed-form solution, regardless of the elastic material properties and initial transformation strain (also called the eigenstrain), has spawned a large amount of work in the mechanics of composites.

Micromechanics is an approach for predicting behaviors of heterogeneous materials. Heterogeneous materials, such as composites, solid foams, polycrystals, or bone, consist of clearly distinguishable constituents (or phases) that show different mechanical and physical material properties. One goal of micromechanics of materials is predicting the response of the heterogeneous material on the basis of the geometries and properties of the individual constituents, which is known as homogenization. Another goal is localization of materials, which attempts to evaluate the local stress and strain fields in the phases for given macroscopic load states, phase properties and phase geometries.

Because most heterogeneous materials show a statistical rather than a deterministic arrangement of the constituents, the methods of micromechanics are typically based on the concept of the representative volume element (RVE). An RVE is understood to be a sub-volume of an inhomogeneous medium that is of sufficient size for providing all geometrical information necessary for obtaining an appropriate homogenized behavior. Most methods in micromechanics of materials are based on continuum mechanics rather than on atomistic approaches such as molecular dynamics.

Currently there are several mechanical solutions for heterogeneous rocks. For example, Single Elastic Inclusion has long been implemented in elasticity calculations. Eshelby's formula leads to the response of a single ellipsoidal elastic inclusion in an elastic whole space to a uniform strain imposed at infinity. In single elastic inclusion, the rock is assumed to be an isotropic and homogeneous elastic medium. However, calculating the external fields to the inclusions can be laborious.

The second is Multiple Elastic Inclusions, which assumes there are infinite number of elastic domains and can be expressed by:

$$\overline{C} = C + \sum_{\alpha=1}^{N} f^{\alpha}(C^{\alpha} - C):J^{\alpha}$$

In which $\overline{C}$ is the overall elasticity tensor, C and $C^{\alpha}$ are the elasticity of the matrix and inclusion phases, respectively, and f is the volume fraction of the inclusion phase, $J^{\alpha}$ is a constant fourth order tensor that relates the average strain of the inclusion. The strain concentration tensor $J^{\alpha}$ and the relationship ($C^{\alpha}$–C) are estimated by using various averaging schemes such as the dilute distribution assumption, the self-consistent method, or the Mori-Tanaka method.

These approaches cannot efficiently model the stress field along the wellbore with minimum mineralogy provided. Thus, a better method is needed in the art.

SUMMARY OF THE DISCLOSURE

This disclosure describes a novel method for predicting continuous wellbore mechanical properties, such as static elastic stiffness, where the properties solutions are deterministic and based on mechanical theory. It has at least three immediate applications: (a) continuous plots of mechanical properties vs. depth, (b) conceptual testing of the effect of changing constituent volume fractions, and (c) ternary plots. The disclosed method can be conducted independent of logging data and does not rely on acoustic wave-speeds. Further, the analysis can be applied to cuttings analysis to derive continuous properties in horizontal wells.

This method uses the continuum micromechanics concept of elastic inclusions to model the composite mechanical behavior of multiphase heterogeneous mixtures. Volume fractions of matrix components and multiphase inclusions are used in this method, and they can be derived continuously from laboratory or log-based mineralogy. Volume averaged eigenstrains are thus solved for any heterogeneous mixture with a microstructural geometry that is approximated by the well-developed Eshelby method.

This disclosure provides an analytical method to predict mechanical properties continuously along the wellbore using a deterministic, mechanics-based approach. Well established multi-mineral micromechanical solution techniques are employed in order to link the elastic rock properties with rock composition and texture from various data such as log-based mineralogy curves or x-ray diffraction data (XRD). In this approach the rock is idealized as a heterogeneous, isotropic, multi-phase composite embedded in an infinite elastic domain.

The individual constituents are assumed to be significantly smaller than the total domain so that all interactions can be solved using a continuous mechanics approach. The host matrix is defined as the dominant mineral constituents with either predetermined properties (e.g., a double-inclusion scheme) or iteratively averaged elastic properties (self-consistent scheme). Each constituent is assumed to be a spheroidal elastic inclusion (e.g. a quartz grain) with a shape factor determined by Eshelby's 6×6 shape tensor [S]. The inclusions are assumed to be evenly distributed in the rock so that the solution is not spatially variant. The micromechanical solution scheme calculates the stress-strain relationships inside and outside of the inclusions using eigenstrain concepts, and then the overall elastic moduli are solved for.

As used herein, the term "inclusion" refers to a mathematically defined small area within a larger area of interest. Each inclusion is assumed to be isotropic, homogeneous and elastic.

As used herein, the term "eigenstrain" refers to the kind of strain (i.e. deformation) produced without external forces or stresses. For example, thermal expansion and phase changes are eigenstrains.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
|---|---|
| XRD | x-ray diffraction |

BRIEF DESCRIPTION OF THE DRAWINGS

FIG. 2A-B shows the modeling results of Young's modulus comparing Finite Element Method (FEM) and MMEPS solution for a 2-phase and 3-phase composite.

FIG. 4A-C shows the modeling results of the disclosed method.

FIG. 4A is a ternary plot of clay—carbonate+pyrite—quartz+feldspar.

FIG. 4B is the grouping of data points based on similar parameters.

FIG. 4C shows the linking between elastic rock properties and rock composition and texture.

DETAILED DESCRIPTION

Figure 1:
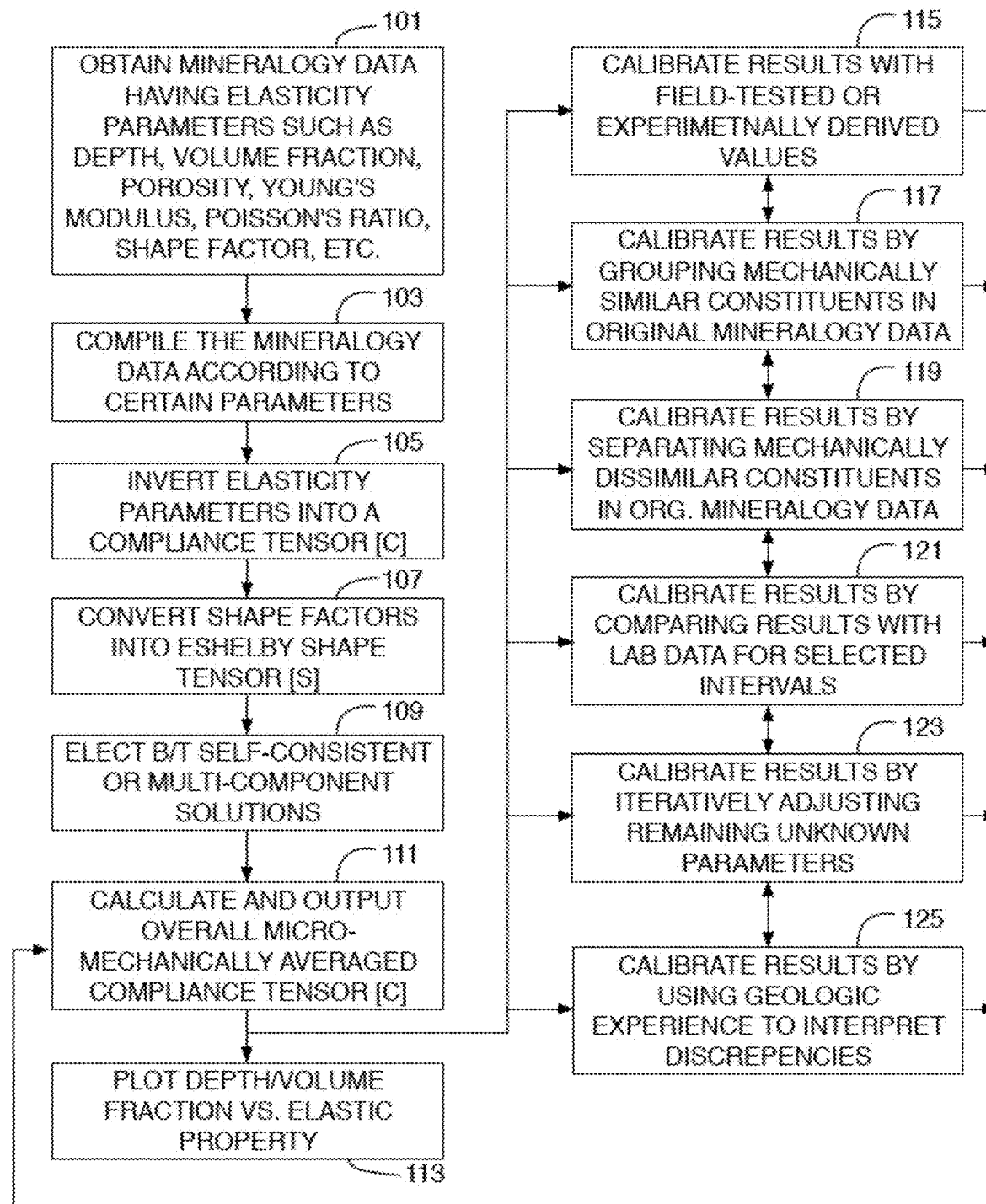
FIG. 1 is a flow chart illustrating the method of this disclosure.

Mechanical rock properties are fundamental input for reservoir stress modeling. Current means to determine mechanical properties from logs is not accurate in shale gas systems. Therefore if a quantitative link between depositional stratigraphy and mechanical stratigraphy can be established to derive continuous mechanical properties, well-drilling can be more efficiently accomplished.

Non-conventional reservoirs refers to reservoirs that are not produced through conventional oil production techniques and may include oil sand, shale, tight-gas sands, coalbed methane, heavy oil, tar sands, etc. These reservoirs generally cannot be simulated through conventional techniques and data. Therefore, the strategy for non-conventional reservoirs could be to constrain the uncertainty in dynamic stress measurements by understanding the relationship between observed deformation behavior and lithology.

The disclosed method therefore focuses on implementing the micromechanical solutions for the overall elastic moduli and its application to mineralogical data from the well, especially as applied to wells located in or near non-conventional reservoirs.

In one embodiment, this disclosure describes a method of deriving continuous mechanical properties in a subterranean formation having at least one wellbore therein, said method comprising: a) obtaining mineralogy data around said wellbore, wherein said mineralogy data comprises composition and texture parameters by depth, constituent type, volume fraction of constituents, porosity, shape factor, and elastic parameters including Young's modulus, Poisson's ratio, bulk modulus, and Lame's constants; b) compiling said mineralogy data by volume fraction and designating at least two of said constituent elasticity parameters; c) inverting said elastic parameters into a compliance tensor [C]; d) converting said shape factor parameters into Eshelby shape tensors; e) performing continuum micromechanical elastic properties modeling iteratively using Eshelby's inclusion method for heterogeneous composite materials; f) calculating overall micro-mechanically averaged compliance tensors; and g) printing or displaying results as at least one of (1) continuous plots of mechanical properties vs. depth, (2) conceptual testing of the effect of changing constituent volume fractions, or (3) ternary plots of volume fraction and elastic properties.

The results of the compliance tensor can be further calibrated by using at least one of the following steps: i) substituting said elasticity parameters in step a) with field-tested value or experimentally derived values from literature; ii) grouping mechanically similar constituents in said mineralogy data; iii) separating mechanically dissimilar constituents in said mineralogy data; iv) comparing the calculated results with laboratory data; v) plotting curves according to the calculated results and iteratively adjusting unknown parameters to match predicted curves to control points; and vi) interpreting discrepancies between the calculated results and control points.

The MicroMechanical Elastic Properties Solver (MMEPS) tool has been developed to perform the approach. MMEPS reads in column-based mineralogical data, typically each data point will include a depth and the volume fraction of each constituent. The user then has the option to modify a data file for each potential constituent that includes its parameters, or for some common constituents, default parameters from the literature can be used.

The program then creates a data structure linking the input mineralogy data to the parameter definitions. Each data point (either sorted by depth or sample name) has its constituents sorted by volume fraction and the software builds compiled data structures depending on if a matrix constituent (maximum volume %) needs to be defined, as is the case for the self-consistent scheme.

A separate micromechanical Matlab script is modified and implemented to invert the elastic input parameters into a compliance tensor [C] and to convert the shape factors into the Eshelby shape tensor [S]. These are also inputs to choose one of two multi-mineral micromechanical solutions (self-consistent or a multi-component e.g., polycrystalline scheme, after Nemat-Nasser and Hori, 1993). Other schemes may be added if necessary.

MMEPS assembles all the data structures and then runs a script that solves the multi-mineral micromechanical equations:

$$\overline{C} = C + \Sigma_{\alpha=1}^{N} f^{\alpha}(C^{\alpha} - C)(\overline{C} - C^{\alpha})^{-1}\overline{C}[(\overline{C} - C^{\alpha})^{-1}\overline{C} - \overline{S}^{\alpha}]^{-1}$$

The above equation is solved using an iterative numerical scheme using an initial guess of $\overline{C}$ and $\overline{S}^{\alpha}$, for example $\overline{C}^0 = C(\mu, v)$ and $\overline{S}^0 = S(v)$, where $\mu, v$ are elastic constants. The incremental form of the micromechanical equation is solved by $$\overline{C}^{n+1} = C - f^{\alpha}(C^{\alpha} - C)[(\overline{C}^n - C^{\alpha})\overline{C}][(\overline{C}^n - C^{\alpha})^{-1}\overline{C}^n - \overline{S}^{\alpha}]^{-1}$$

From the new matrix $\overline{C}^{n+1}$ the updated elastic parameter $v^{n+1}$ is determined and used to update $\overline{S}$ as $\overline{S}^{n+1}(v^{n+1})$. The iteration ends when norm($\overline{C}^{n+1} - \overline{C}^n$)<critical value, e.g. $10^{-6}$. The scheme generally converges in about 4~7 iterations with an error of <10%.

The program then outputs the overall "micromechanically averaged" compliance tensor [C] for each data point. It has options to export compliance or to solve for other stiffness moduli such as Young's modulus, shear modulus, etc.

A plotting script is run to create e.g., one or more graphs, such as (1) depth vs. elastic property (in the case of log-based data); (2) volume fraction vs. elastic property (in the case of conceptual modeling of compositional mixing effects); (3) a ternary plot comprised of a color contoured equilateral triangle, where the color is the elastic property and the points of the triangle are volume fractions for sedimentalogically sorted end-members (e.g., total clay-carbonate-siliciclastics).

The solution results can be calibrated by at least one of the following: (1) inputting the best-known constituent parameters using field-tested values or experimentally derived values from the literature; (2) grouping mechanically similar constituents in the original mineralogy data file to reduce the number of independent variables that must be calibrated; (3) separating mechanically dissimilar constituents in the original data file if necessary (e.g., separating quartz grains from quartz overgrowth cement if thin section data is also available); (4) comparing the solver predictions with laboratory data for selected intervals to "lock-in" constituent parameters and reduce the number of unknowns; (5) iteratively adjusting remaining unknown parameters to match the continuous predicted curves to control points; and (6) using geologic experience to interpret remaining discrepancies (e.g., a certain zone has undergone a unique cementation process or thin micro-laminations are introducing anisotropic effects).

The technique offers an alternative way to derive continuous mechanical elastic properties in the wellbore. Previously, the only approach readily available to derive continuous mechanical properties was based on dynamic moduli measured with sonic velocity-based logging tools or using empirical transforms for gamma ray and density logs. The sonic-approach requires conversion using a dynamic-static transform, which may be difficult to attain in horizontal wells. The gamma ray and density log approach is typically poorly calibrated and yields extreme non-unique solutions.

The developed micromechanical approach in this disclosure does not require a dynamic-static transform, and is instead based on geologic description of the composition and texture, and when applied to drilling cuttings data (e.g., XRD), can be used continuously along horizontal wells, where there are often difficulties running the logging tools.

Referring to FIG. 1, which is a flow chart of the disclosed method, as exemplified in a script for MATLAB. However, the same concept can be applied to any software that process geomechanical information.

In step 101, the first step of the method is to obtain and import the mineralogy data around a particular wellbore of interest. The mineralogy data is preferably column-based and typically contains information such as the depth of the location where the sample was taken, and the volume fraction of each constituent. For example, for a sample that was taken at 2,500 feet below surface and having quartz, calcite, kerogen with 50% porosity, the data would read 2500-0.25-0.5-0.2-0.5.

In step 103, the user may modify and compile the data file for each potential constituent that includes certain useful parameters. In some embodiments, default parameters from literature or other verified sources may be used for certain common constituents. For example, the parameters for a quartz grain may read: [Quartz—Young's modulus=30 GPa; Poisson's ratio=0.15; shape factor a=b=c=1 (i.e. sphere)]. The program then creates a data structure linking the input mineralogy data in step 101 to the parameter definitions. The data file can be sorted however the user wishes, and each data point has its constituents sorted by volume fraction. The software thus builds a compiled data structure.

In step 105, with this modified data file, the software then inverts the elasticity parameters into an initial compliance tensor [C]. The typical elastic inputs are Young's modulus E and Poisson's ratio v. For the isotropic case there are only two parameters and the elastic tensor can be written as $$C_{ijkl} = \lambda \delta_{ij}\delta_{kl} + \mu(\delta_{ij}\delta_{kl} + \lambda \delta_{il}\delta_{jl})$$

Where $\lambda$ and $\mu$ are Lame constants, and $\lambda = K - 2\mu/3$, and K is the Bulk modulus, $K = E/3(1-2v)$, so that for example, component $$C_{11} = \frac{E}{1+v} + \frac{1-v}{1-2v}.$$

In step 107, the shape factor is converted to Eshelby 6×6 shape tensor [S]. This is required to apply the Eshelby inclusion as discussed above. For the most general cases, the form of Eshelby's shape tensor for an ellipsoidal inclusion with semi-axes $a_1>a_2>a_3$ has the form as $$\begin{bmatrix} Qa_1^2 I_{11} + RI_1 & Qa_2^2 I_{12} - RI_1 & Qa_3^2 I_{13} - RI_1 & 0 & 0 & 0 \\ Qa_1^2 I_{21} - RI_2 & Qa_2^2 I_{22} + RI_2 & Qa_3^2 I_{23} - RI_2 & 0 & 0 & 0 \\ Qa_1^2 I_{31} - RI_3 & Qa_2^2 I_{32} - RI_3 & Qa_3^2 I_{33} + RI_3 & 0 & 0 & 0 \\ 0 & 0 & 0 & \frac{Q}{2}(a_1^2 + a_2^2)I_{12} + \frac{R}{2}(I_1 + I_2) & 0 & 0 \\ 0 & 0 & 0 & 0 & \frac{Q}{2}(a_2^2 + a_3^2)I_{23} + \frac{R}{2}(I_2 + I_3) & 0 \\ 0 & 0 & 0 & 0 & 0 & \frac{Q}{2}(a_3^2 + a_1^2)I_{31} + \frac{R}{2}(I_3 + I_1) \end{bmatrix}$$

In which Q and R are constants as $Q=3/8\pi(1-v)$, and $R=(1-2v)/8\pi(1-v)$. The I terms are given as follows $$I_1 = \frac{4\pi a_1 a_2 a_3}{(a_1^2 - a_2^2)\sqrt{a_1^2 - a_3^2}}\left[\int_0^\theta \frac{1}{\sqrt{1-k^2\sin^2\xi}}\,d\xi - \int_0^\theta \sqrt{1-k^2\sin^2\xi}\,d\xi\right]$$

$$I_3 = \frac{4\pi a_1 a_2 a_3}{(a_2^2 - a_3^2)\sqrt{a_1^2 - a_3^2}}\left[\frac{a_2\sqrt{a_1^2 - a_3^2}}{a_1 a_3} - \int_0^\theta \sqrt{1-k^2\sin^2\xi}\,d\xi\right]$$

$$I_2 = 4\pi - I_1 - I_3$$

$$I_{ij} = \frac{I_i - I_j}{3(a_i^2 - a_j^2)}, i \neq j$$

$$I_{ii} = \frac{4\pi}{3a_i^2} - I_{ij} - I_{ik}, i \neq j \neq k$$

In which the parameter $\theta$ and k have the form as $$\theta = \sin^{-1}\sqrt{1 - \frac{a_3^2}{a_1^2}},\quad k = \sqrt{\frac{a_1^2 - a_2^2}{a_1^2 - a_3^2}}$$

For example, one special geometric case is an oblate spheroid with axes ($a_1=a_2>a_3$)

$$I_1 = I_2 = \frac{2\pi a_1^2 a_3}{(a_1^2 - a_3^2)^{3/2}}\left[\cos^{-1}\frac{a_3}{a_1} - \frac{a_3}{a_1}\left(1 - \frac{a_3^2}{a_1^2}\right)^{1/2}\right]$$

$$I_{12}I_{21} = \pi/3a_1^2 - I_{13}/4$$

In step 109, the user elects either the self-consistent or multi-component schemes, which means the elastic properties of the dominant constituents are either predetermined or iteratively averaged and corrected. Either scheme provides effective medium approximations based on Eshelby's elasticity solution for an inhomogeneity embedded in an infinite medium. The multiphase composite method (Nemat-Nasser and Hori, 1993) is a generalization of the double-inclusion method and assumes an ellipsoidal volume with inclusions and its overall properties, all embedded in an infinite elastic domain with a known elasticity. Interactions are approximated and it is not necessary to have a matrix phase. If a matrix phase is required, then the infinite elasticity can be set in one of two ways. If the infinite elasticity is set to the matrix constituent C, then the result is the Mori-Tanaka model. If the infinite elasticity C of the medium is selected as equal to the overall material properties of the composite, the self-consistent method is modeled and numerical iteration is required to determine the converged overall stiffness from an initial estimate.

Figure 5A:
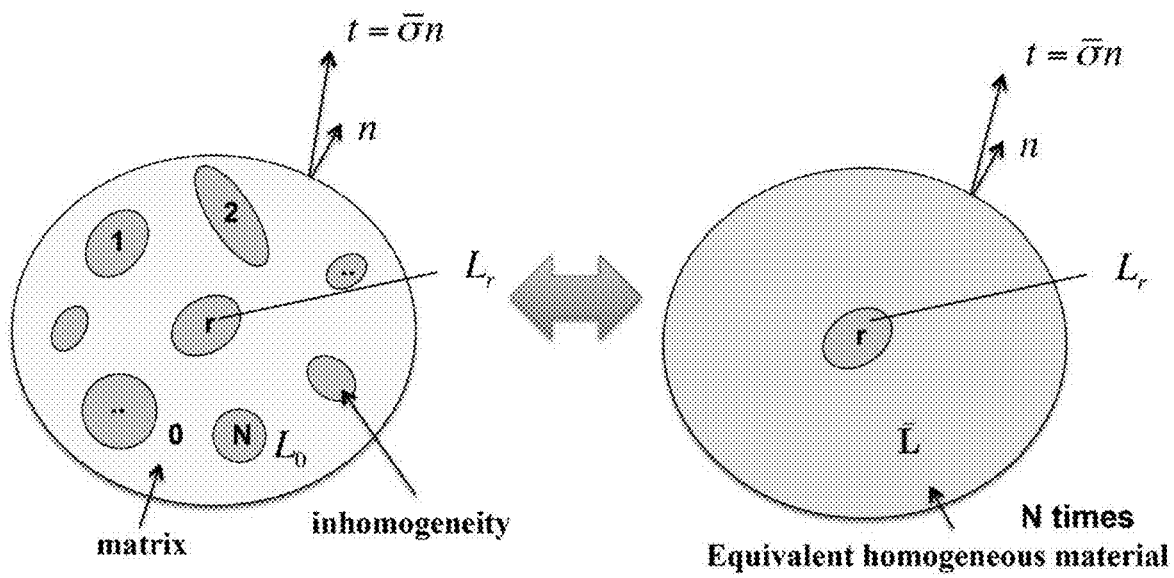
FIG. 5A-B illustrates the basic assumptions of inhomogeneities and same volume fraction for the phases in the inclusion scheme.
Figure 5B:
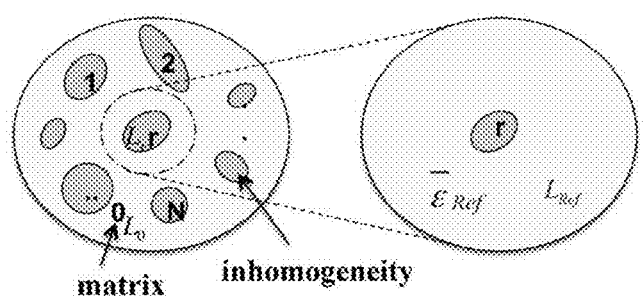

The basic assumptions are inhomogeneities and same volume fraction for the phases, as illustrated in FIG. 5A-B.

The user has the option to import experimentally proven values for the elastic properties to be used as the inclusion properties. Each constituent is assumed to be an ellipsoidal elastic inclusion with a shape factor determined by the axes ($a_1$, $a_2$, $a_3$) that are input into the equation for Eshelby's 6×6 shape tensor [S]. The shape factor can be determined from thin section analysis or other methods.

The internal stresses and strains are solved for within the heterogeneous volume depending on whether boundary strain or stress is applied. The convention of Nemat-Nasser and Hori (1999) is implemented in the software, however other equivalent forms of the homogenization can be used. For example, consider the self-consistent scheme and that a composite is subjected to the displacement boundary condition:

$$u^0 = \varepsilon^0 x$$

Each phase is considered as a single inhomogeneity embedded in the effect medium:

$$A_r = \overline{T}_r \text{ and } A_0 = \frac{1}{c_0}\left(I - \sum_{r=1}^N c_r A_r\right)$$

The localization tensor is then obtained from the effective elastic properties of the medium:

$$\overline{T}_r = [I + \overline{SM}(L_r - \overline{L})]^{-1}$$

where $\overline{L} = \sum_{r=0}^N c_r L_r A_r$

Consider the composite being subjected to prescribed tractions:

$$t^0 = \sigma^0 n$$

At the boundary, the strain is expressed using the Hooke's law:

$$\varepsilon^0 = \overline{M}\sigma^0 \rightarrow \varepsilon^0 = \overline{M}\overline{\sigma}$$

$$T_r \varepsilon^0 = T_r \overline{M}\sigma \rightarrow \varepsilon_r = \overline{T}_r \overline{M}\overline{\sigma}$$

By applying the Hooke's law again:

$$\sigma_r = L_r \overline{T}_r \overline{M}\overline{\sigma}$$

The stress concentration tensor is therefore written as:

$$B_r = L_r \overline{T}_r \overline{M} \quad \text{and:} \quad B_0 = \frac{1}{c_0}\left(I - \sum_{r=1}^{N} c_r B_r\right)$$

Finally, the effective stiffness tensor is obtained from the expression of the concentration tensors because:

$$\overline{M} = \sum_{r=0}^{N} c_r M_r B_r$$

and $\overline{ML} = I$

In summary, for self-consistent scheme, average strain of the composite is:

$$\overline{\varepsilon}_{Ref} \varepsilon^0 = \overline{\varepsilon} \text{ where } L_{Ref} = \overline{L}$$

Instead of dealing with phases of the above-mentioned heterogeneous solid, a technique is used to approximate an equivalent homogeneous solid with uniform properties. The difference between the properties of the inclusions and matrix are addressed by introducing the micromechanical concept of eigenstrains or eigenstresses due to either far-field stresses or strains, respectively. The eigenstrain $\varepsilon^*$ is the suitable strain field introduced in the domain such that the equivalent homogeneous solid has the same strain and stress fields as the actual heterogeneous solid under applied tractions or displacements, whichever may be the case. The strain and stress fields over the matrix M and inclusion $\Omega$ are thus given as a function of the uniform (e.g., $\varepsilon^0$) and disturbed ($\varepsilon^d$) states:

$$\varepsilon(x) = \varepsilon^0 + \varepsilon^d(x) \text{ and } \sigma(x) = \sigma^0 + \sigma^d(x)$$

$$\sigma(x) = C : (\varepsilon(x) - \varepsilon^*(x)) = \begin{cases} C : (\varepsilon^0 + \varepsilon^d(x)) & \text{in } M \\ C : (\varepsilon^0 + \varepsilon^d(x) - \varepsilon^*(x)) & \text{in } \Omega \end{cases}$$

The average eigenstrains over the matrix and inclusions are substituted back into exact solutions for the average strain and stress over the volume. The elastic tensors are derivations of the stress and strain fields.

In step 111, the overall elastic moduli are then calculated according to predetermined equations and the overall micromechanically averaged compliance tensor [C] is obtained. The combined effect of all the inclusions among the domain is determined by their respective volume fractions. The constituents with higher volume fractions will be assigned higher weight in the calculation. Here the inclusions are assumed to be evenly distributed in the rock so that the solution is not spatially variant. In other words, the Representative Volume Element or "RVE" is maintained. The micromechanical solution scheme calculates the stress-strain relationship inside and outside of the inclusion, including at the boundaries, and then the overall elastic moduli are solved for.

In one embodiment, equations are given for the multi-phase composite, Mori-Tanaka, or self-consistent methods, depending on how the matrix stiffness is prescribed, and according the form:

$$\overline{C} = C + \sum_{\alpha=1}^{N} f^\alpha (C^\alpha - C)(\overline{C} - C^\alpha)^{-1} \overline{C}[(\overline{C} - C^\alpha)^{-1}\overline{C} - \overline{S}^\alpha]^{-1}$$

However, other suitable solution methods may also be used interchangeably or integrated herein. For example, a Hashin-Shtrikman definition may be added so that the results are compatible with other two-component rock physics tools.

Hashin-Shtrikman Bounds.

The Hashin-Shtrikman bounds are the tightest bounds possible from range of composite moduli for a two-phase material. Specifying the volume fraction of the constituent moduli allows the calculation of rigorous upper and lower bounds for the elastic moduli of any composite material. The so-called Hashin-Shtrikman bounds for the bulk, K, and shear moduli μ is given by:

$$K_{HS}^{\pm} = K_2 + \frac{\phi}{(K_1 - K_2)^{-1} + \frac{1 - \phi}{K_2 + 4\mu_2/3}}$$

$$\mu_{HS}^{\pm} = \mu_2 + \frac{\phi}{(\mu_1 - \mu_2)^{-1} + \frac{2(1-\phi)(K_2 + 2\mu_2)}{5\mu_2(K_2 + 4\mu_2/3)}}$$

The upper bound is computed when $K_2 > K_1$. The lower bound is computed by interchanging the indices in the equations. For the case of a solid-fluid mixture, $K_2$ is $K_S$, the bulk modulus of the solid component, and $K_1$ is $K_f$, the bulk modulus of the fluid component.

In step 113, the user has the option to plot the results as depth vs. elastic properties, volume fraction vs. elastic properties, or as a ternary plot, depending on user's need. Depth vs. elastic property plots is typically used for log-based data; the volume fraction vs. elastic property plot is typically used for conceptual modeling of compositional mixing effects; the ternary plot usually comprises a color-contoured equilateral triangle, where the color is the elastic property and the points of the triangle are volume fractions for sedimentalogically sorted end-members, such as total clay-carbonate-siliciclastics as the three points.

Alternatively or in addition, the final results can be recorded and stored and/or sent to another reservoir modeling program. Ultimately, the results are used to make and implement decisions on an optimal development plan for a reservoir and/or to predict production levels and the like.

Steps 115-125 are several ways to calibrate the modeling results in steps 111. These steps may be used alone or two or more of these steps may be used together to obtain more accurate results.

In step 115, the inputs for parameters of the constituents are replaced with field-tested values or experimentally derived values. The results are then compared with the results from step 111 to see if further adjustment to the method is necessary.

In step 117, the inputs for parameters of the constituents are grouped based on mechanical similarities. The similar ones are grouped together to reduce the number of independent variables that need to be calibrated. By "similar" what is meant is the type of the constituent is the similar, such as grouping two types of clay, and that grouping the parameters results in no more than 30% variation, preferably no more than 25%, and most preferably no more than 20% variation from a solution that does not group similar constituents.

In step 119, the inputs for parameters of the constituents are separated if they are mechanically dissimilar. For example, thin section petrographic characterization may be available to distinguish quartz grains from quartz overgrowth cement. By "dissimilar" what is meant is the type of the constituent is believed to be mechanically distinct, the volume fraction of each constituent may be different, and differentiating the components yields results with values are at least 30% different from leaving the components grouped. For example, matrix supporting clay should be distinguished from grain-coating cement occurring from diagenetic alteration.

In step 121, the modeling results are compared with laboratory data for selected intervals (i.e. those with same parameters), so as to "lock-in" the constituent parameters and reduce the number of unknowns. For example, a laboratory sample with 90% quartz volume of and 10% porosity can be used to set the constituent parameters for quartz by assuming the porous volume has zero stiffness.

In step 123, the modeling results from step 111 are iteratively adjusted for the remaining unknown parameters to match the continuous prediction curves to control points. For example, if the user can use step 121 to determine the parameters for quartz and porosity phases, then a third sample containing 80% quartz, 10% porosity, and 10% clay could be used to solve for the unknown stiffness of the clay phase.

In step 125, already existing geologic experience can be helpful in interpreting the remaining discrepancies between the calculated results and the actual observation. For example, for certain zones that undergo a unique cementation process or thin micro-lamination could introduce anisotropic effects to the formation. Such experience can be added to the software so that the discrepancies can be accounted for and corrected.

The final results can be displayed in any suitable manner, e.g., on a monitor, projected as a hologram, or printed for use. Alternatively, the results can be stored in memory, and/or forwarded to another program for further use, e.g., in reservoir modeling, planning, and the like.

The following descriptions are intended to be illustrative only, and not unduly limit the scope of the appended claims.

Test 1

The hypothetical variations of a two-phase rock was tested for validating the model. Under the FE (finite element) Model, a triaxial loading of heterogeneous plug was assumed, where the Young's moduli (E) varied for each element. For this test, the results of the finite element method are assumed to represent the actual overall stiffness of the rock as a function of compositional variation. The overall elasticity of the same rock formation was also modeled by using Micromechanical Elastic Properties Solver (MMEPS) of this disclosure. The results are shown in FIG. 2A-B.

Results show that Young's modulus decreases non-linearly with addition of the less stiff volume constituent. For the two-phase model (FIG. 2A) the MMEPS solution using the self-consistent scheme (E_ SC) closely matches the finite element result, whereas the multiphase-component model (E_MPC) has greater error. The MMEPS implementation allowed for very rapid testing of an appropriate micromechanical solution for this configuration, with generation of the input file taking only a minute and computational run-time of only a few seconds. In contrast, the finite element solution set took several hours to build, run, and compile results.

Similarly, FIG. 2B shows the robustness of the MMEPS model to add a third volume phase, porosity, shown for 5% and 10% volume fractions, and using the self-consistent model. Setting up and running the model using MMEPS took only a few seconds, whereas adding porosity to the same finite element would have increased model setup time and run time significantly.

Test 2

Figure 3A:
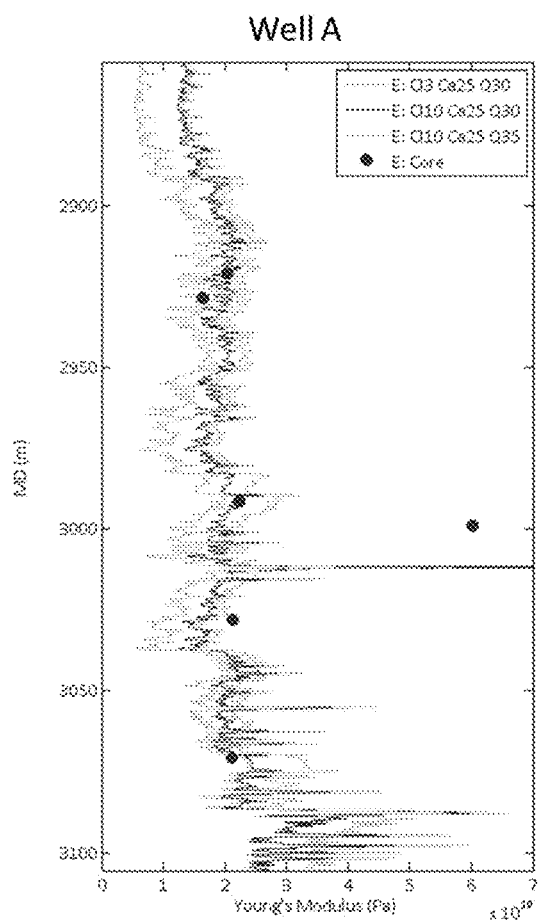
FIG. 3A-B shows the continuous modeling for Young's Modulus along two wellbores.
Figure 3B:
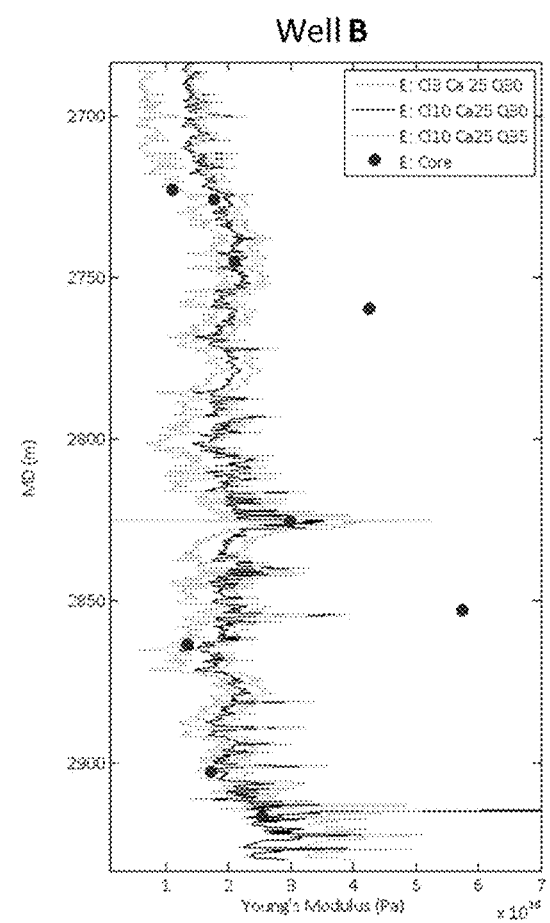

The MMEPS modeling approach was further tested with two wells in the Muskwa formation, Horn River Basin Canada. The method was as described above. FIG. 3A-B shows the depth vs. Young's Modulus chart, where the actual core data taken at different depth was compared with different volume fractions of clay, calcite and quartz. FIG. 3A-B shows that the modeling results closely follow the actual core data.

Test 3

The third test shows the ability to link potentially proprietary MMEPS mechanical solutions to other supporting data, for example micro-facies characterization from published papers. An exemplary ternary plot based on the MMEPS approach is shown in FIG. 4A-C, where the mineralogy data was taken from the Lewis Shale in Wyoming.

FIG. 4A is a ternary plot showing volume fraction total clay—carbonate+pyrite—quartz+feldspar. The ternary plot shows data from a ConocoPhillips well overlaid on digitized results from a publication by Almon et al. (2005), who provide the mineral categorization scheme. All the mineralogy data is overlaid on an MMEPS elastic properties solution that is calibrated to unpublished laboratory data. This is an easy way to quickly identify the elastic properties of the formation.

FIG. 4B is an exemplary grouping of data points based on similar properties for the data (Almon et al. 2005). For example, Group 1 is likely to show similar properties as massive organic mudstones; Group 2 is likely to show similar properties as organic laminated shales; Group 3 is likely to show similar properties as calcareous laminated shales; Group 4 is likely to show similar properties as organic bioturbated shales; and Group 5 is likely to show similar properties as massive calcareous.

In this grouping, a centroid is iteratively calculated by averaging the values of all included data points, and the variation between each data point and the centroid is then calculated. The overlapped grouping will adopt smaller variation to remove the overlap. This grouping further simplifies the modeling process, because instead of 100 data points, now only 5 groups of similar properties are considered, and which can be linked back to the ternary plot. Accuracy may be sacrificed for simplification, but an optimal balance can be achieved by adjusting the grouping criteria.

FIG. 4C shows the linking between elastic rock properties and rock composition and texture (Almon et al. 2005). This compiled data is not only useful for current wellbore, but can serve as additional references for future wellbores that have similar properties in terms of composition, depth and elastic properties.

The minimum computer requirements are programming language software that can incorporate the algorithms. Because the equations include a numerical iterative scheme, software capable of programming and running iterative loops must be used. A robust graphical plotting tool is necessary to display multiple solutions, such as continuous logs or the properties ternary plot. The present implementation was performed in MATLAB, though other programming environments such as FORTRAN could be used.

The following references are incorporated by reference in their entirety for all purposes:

WO2009108432 Rock physics model for simulating seismic response in layered fractured rocks.

US20140373616 Mechanical characterization of core samples.

US20140352949 Integrating rock ductility with fracture propagation mechanics for hydraulic fracture design.

Voigt, W. (1889), Uber die Beziehung zwischen den beiden Elastizitatskonstanten isotroper Korper, Wied. Ann. Physik, Vol. 38, 573-587.

Budianksy, B. (1965), On the elastic moduli of some heterogeneous materials, J. Mech. Phys. Solids, Vol. 13, 223-227.

Hashin, Z. (1962), The elastic moduli of heterogeneous materials, ASME J. Appl. Mech., Vol. 29, 143-150.

Hashin, Z. and Shtrikman, S. (1963), A Variational approach to the theory of the elastic behavior of multiphase materials, J. Mech. Phys. Solids, Vol. 11, 127-140.

Hashin, Z. (1968), Assessment of the self-consistent scheme approximation, J. Compos. Mater., Vol. 2, 284-300.

Hill, R. (1965), A self-consistent mechanics of composite materials, J. Mech. Phys. Solids, Vol. 13, 213-222.

Kroner, E. (1958), Berechnung der elastischen Konstanten des Vielkristalls aus den Konstanten des Einkristalls, Z. Phys. Vol. 151, 504-518.

Mori, T., and Tanaka, K. (1973), Average stress in matrix and average elastic energy of materials with misfitting inclusions, Acta Met., Vol. 21, 571-574.

Nemat-Nasser, S., and Hori, M. (1999). Micromechanics: overall properties of heterogeneous materials. Elsevier Science B.V., Amsterdam, The Netherlands, Second edition, 786 pages.

What is claimed is:

1. A method of deriving continuous mechanical properties, said method comprising:
    obtaining mineralogy data from drill cuttings from a wellbore using x-ray diffraction (XRD), wherein said mineralogy data comprises composition and texture parameters by depth, constituent type, volume fraction of constituents, porosity, shape factor, and elastic parameters including Young's modulus, Poisson's ratio, bulk modulus, and Lame's constants;
    compiling said mineralogy data by volume fraction and designating at least two of said elastic parameters;
    inverting said elastic parameters into a compliance tensor;
    converting said shape factor into Eshelby shape tensors;
    performing continuum micromechanical elastic properties modeling iteratively on the Eshelby shape tensors using Eshelby's inclusion method for heterogeneous composite materials;
    calculating an overall micro-mechanically averaged compliance tensor based on the continuum micromechanical elastic properties modeling; and
    displaying results as at least one of (1) continuous plots of the overall micro-mechanically averaged compliance vs. depth, (2) conceptual testing of an effect of changing the volume fraction of constituents, or (3) ternary plots of volume fraction and elastic properties,
    wherein the continuum micromechanical elastic properties modeling is performed with the following equation:

$$\overline{C} = C + \sum_{\alpha=1}^{N} f^{\alpha}(C^{\alpha} - C)(\overline{C} - C^{\alpha})^{-1}\overline{C}\left[(\overline{C} - C^{\alpha})^{-1}\overline{C} - \overline{S}^{\alpha}\right]^{-1}$$

using an initial assumption of $\overline{C}$ and $\overline{S}^{\alpha}$ to incrementally solve the equation by $$\overline{C}^{n+1} = C - f^{\alpha}(C^{\alpha} - C)[(\overline{C}^n - C^{\alpha})\overline{C}][(\overline{C}^n - C^{\alpha})^{-1}\overline{C}^n - \overline{S}^{\alpha}]^{-1},$$

wherein C is the compliance tensors, $\overline{C}$ is an overall micromechanically averaged compliance tensor, $f^{\alpha}$ is a volume fraction of an inclusion phase, $C^{\alpha}$ is an elasticity of the inclusion phase, and $\overline{S}^{\alpha}$ is an elasticity of the Eshelby inclusion plane.

2. The method of claim 1, further comprising sorting said mineralogy data according to the volume fraction.

3. The method of claim 1, further comprising calibrating said compliance tensor using at least one of the following steps:
    i) substituting said elastic parameters with a field-tested value and/or experimentally derived values from literature;
    ii) grouping mechanically similar constituents in said mineralogy data;
    iii) separating mechanically dissimilar constituents in said mineralogy data;
    iv) comparing the overall micro-mechanically averaged compliance tensor with laboratory data;
    v) plotting curves according to the overall micro-mechanically averaged compliance tensor and iteratively adjusting unknown parameters to match predicted curves to one or more control points; and
    vi) interpreting discrepancies between the overall micro-mechanically averaged compliance tensor and one or more control points.

4. The method of claim 1, wherein the Eshelby's tensor is represented by the following matrix:

$$\begin{bmatrix} Qa_1^2 I_{11} + RI_1 & Qa_2^2 I_{12} - RI_1 & Qa_3^2 I_{13} - RI_1 & 0 & 0 & 0 \\ Qa_1^2 I_{21} - RI_2 & Qa_2^2 I_{22} + RI_2 & Qa_3^2 I_{23} - RI_2 & 0 & 0 & 0 \\ Qa_1^2 I_{31} - RI_3 & Qa_2^2 I_{32} - RI_3 & Qa_3^2 I_{33} + RI_3 & 0 & 0 & 0 \\ 0 & 0 & 0 & \frac{Q}{2}(a_1^2 + a_2^2)I_{12} + \frac{R}{2}(I_1 + I_2) & 0 & 0 \\ 0 & 0 & 0 & 0 & \frac{Q}{2}(a_2^2 + a_3^2)I_{23} + \frac{R}{2}(I_2 + I_3) & 0 \\ 0 & 0 & 0 & 0 & 0 & \frac{Q}{2}(a_3^2 + a_1^2)I_{31} + \frac{R}{2}(I_3 + I_1) \end{bmatrix}$$

wherein a1, a2, a3 are semi-axes and a1>a2>a3; Q and R are constant where $Q=\frac{3}{8}\pi(1-v)$ and $R=(1-2v)/8\pi(1-v)$; the I terms are $$I_1 = \frac{4\pi a_1 a_2 a_3}{(a_1^2 - a_2^2)\sqrt{a_1^2 - a_3^2}} \left[ \int_0^\theta \frac{1}{\sqrt{1-k^2\sin^2\xi}} d\xi - \int_0^\theta \sqrt{1-k^2\sin^2\xi}\, d\xi \right]$$

$$I_3 = \frac{4\pi a_1 a_2 a_3}{(a_2^2 - a_3^2)\sqrt{a_1^2 - a_3^2}} \left[ \frac{a_2\sqrt{a_1^2 - a_3^2}}{a_1 a_3} - \int_0^\theta \sqrt{1-k^2\sin^2\xi}\, d\xi \right]$$

$$I_2 = 4\pi - I_1 - I_3$$

$$I_{ij} = \frac{I_i - I_j}{3(a_i^2 - a_j^2)}, i \neq j$$

$$I_{ii} = \frac{4\pi}{3a_i^2} - I_{ij} - I_{ik}, i \neq j \neq k$$

wherein the parameter θ and k are represented as $$\theta = \sin^{-1}\sqrt{1-\frac{a_3^2}{a_1^2}}, k = \sqrt{\frac{a_1^2 - a_2^2}{a_1^2 - a_3^2}}.$$

5. The method of claim 1, wherein the elastic properties in the continuum micromechanical elastic properties modeling are imported from experimentally proven values.

6. The method of claim 1, wherein the initial assumption $\overline{C}^0 = C(\mu, v)$ and $\overline{S}^0 = S(v)$, where $\mu, v$ are elastic constants.

7. The method of claim 1, wherein performing continuum micromechanical elastic properties modeling is terminated when $\text{norm}(\overline{C}^{n+1} - \overline{C}^n)$ is smaller than a predetermined critical value.

8. The method of claim 1, wherein performing continuum micromechanical elastic properties modeling is performed for more than 3 iterations and fewer than 8 iterations.

9. The method of claim 1, wherein the Eshelby's tensor is represented by the following matrix:

$$\begin{bmatrix} Qa_1^2 I_{11} + RI_1 & Qa_2^2 I_{12} - RI_1 & Qa_3^2 I_{13} - RI_1 & 0 & 0 & 0 \\ Qa_1^2 I_{21} - RI_2 & Qa_2^2 I_{22} + RI_2 & Qa_3^2 I_{23} - RI_2 & 0 & 0 & 0 \\ Qa_1^2 I_{31} - RI_3 & Qa_2^2 I_{32} - RI_3 & Qa_3^2 I_{33} + RI_3 & 0 & 0 & 0 \\ 0 & 0 & 0 & \frac{Q}{2}(a_1^2 + a_2^2)I_{12} + \frac{R}{2}(I_1 + I_2) & 0 & 0 \\ 0 & 0 & 0 & 0 & \frac{Q}{2}(a_2^2 + a_3^2)I_{23} + \frac{R}{2}(I_2 + I_3) & 0 \\ 0 & 0 & 0 & 0 & 0 & \frac{Q}{2}(a_3^2 + a_1^2)I_{31} + \frac{R}{2}(I_3 + I_1) \end{bmatrix}$$

wherein a1, a2, a3 are semi-axes and a1>a2>a3; Q and R are constant where $Q=\frac{3}{8}\pi(1-v)$ and $R=(1-2v)/8\pi(1-v)$; the I terms are $$I_1 = \frac{4\pi a_1 a_2 a_3}{(a_1^2 - a_2^2)\sqrt{a_1^2 - a_3^2}} \left[ \int_0^\theta \frac{1}{\sqrt{1-k^2\sin^2\xi}} d\xi - \int_0^\theta \sqrt{1-k^2\sin^2\xi}\, d\xi \right]$$

$$I_3 = \frac{4\pi a_1 a_2 a_3}{(a_2^2 - a_3^2)\sqrt{a_1^2 - a_3^2}} \left[ \frac{a_2\sqrt{a_1^2 - a_3^2}}{a_1 a_3} - \int_0^\theta \sqrt{1-k^2\sin^2\xi}\, d\xi \right]$$

-continued $$I_2 = 4\pi - I_1 - I_3$$

$$I_{ij} = \frac{I_i - I_j}{3(a_i^2 - a_j^2)}, i \neq j$$

$$I_{ii} = \frac{4\pi}{3a_i^2} - I_{ij} - I_{ik}, i \neq j \neq k$$

wherein the parameter θ and k are represented as $$\theta = \sin^{-1}\sqrt{1-\frac{a_3^2}{a_1^2}}, k = \sqrt{\frac{a_1^2 - a_2^2}{a_1^2 - a_3^2}}.$$

10. The method of claim 1, wherein one or more drilling operations can be adjusted in view of overall micro-mechanically averaged compliance tensor.

11. A method of deriving continuous mechanical properties, said method comprising:
  obtaining mineralogy data from drill cuttings from a wellbore using x-ray diffraction (XRD), wherein said mineralogy data comprises composition and texture parameters by depth, constituent type, volume fraction of constituents, porosity, shape factor, and elastic parameters including Young's modulus, Poisson's ratio, bulk modulus, and Lame's constants;
  compiling said mineralogy data by volume fraction and designating at least two of said elastic parameters;
  inverting said elastic parameters into a compliance tensor;
  converting said shape factor into Eshelby shape tensors;
  performing continuum micromechanical elastic properties modeling iteratively on the Eshelby shape tensors using Eshelby's inclusion method for heterogeneous composite materials;
  calculating an overall micro-mechanically averaged compliance tensor based on the continuum micromechanical elastic properties modeling using at least one of the following steps:
  i) substituting said elastic parameters in step a) with field-tested value or experimentally derived values from literature;
  ii) grouping mechanically similar constituents in said mineralogy data;
  iii) separating mechanically dissimilar constituents in said mineralogy data;
  iv) comparing the overall micro-mechanically averaged compliance tensor with laboratory data;
  v) plotting curves according to the overall micro-mechanically averaged compliance tensor and iteratively adjusting unknown parameters to match predicted curves to one or more control points; and vi) interpreting discrepancies between the overall micro-mechanically averaged compliance tensor and one or more control points, displaying results as at least one of (1) continuous plots of the overall micro-mechanically averaged compliance vs. depth, (2) conceptual testing of an effect of changing the volume fraction of constituents, or (3) ternary plots of volume fraction and elastic properties, wherein the continuum micromechanical elastic properties modeling is performed with the following equation:

$$\begin{bmatrix} Qa_1^2 I_{11} + RI_1 & Qa_2^2 I_{12} - RI_1 & Qa_3^2 I_{13} - RI_1 & 0 & 0 & 0 \\ Qa_1^2 I_{21} - RI_2 & Qa_2^2 I_{22} + RI_2 & Qa_3^2 I_{23} - RI_2 & 0 & 0 & 0 \\ Qa_1^2 I_{31} - RI_3 & Qa_2^2 I_{32} - RI_3 & Qa_3^2 I_{33} + RI_3 & 0 & 0 & 0 \\ 0 & 0 & 0 & \frac{Q}{2}(a_1^2 + a_2^2)I_{12} + \frac{R}{2}(I_1 + I_2) & 0 & 0 \\ 0 & 0 & 0 & 0 & \frac{Q}{2}(a_2^2 + a_3^2)I_{23} + \frac{R}{2}(I_2 + I_3) & 0 \\ 0 & 0 & 0 & 0 & 0 & \frac{Q}{2}(a_3^2 + a_1^2)I_{31} + \frac{R}{2}(I_3 + I_1) \end{bmatrix}$$

$$\overline{C} = C + \sum_{\alpha=1}^{N} f^\alpha (C^\alpha - C)(\overline{C} - C^\alpha)^{-1} \overline{C} \left[ (\overline{C} - C^\alpha)^{-1} \overline{C} - \overline{S}^\alpha \right]^{-1}$$

using an initial assumption of $\overline{C}$ and $\overline{S}^\alpha$ to incrementally solve the equation by $$\overline{C}^{n-1} C - f^\alpha (C^\alpha - C) \left[ (\overline{C}^n - C^\alpha) \overline{C} \right] \left[ (\overline{C}^n - C^\alpha)^{-1} \overline{C}^n - \overline{S}^\alpha \right]^{-1}$$

wherein C is the compliance tensors, $\overline{C}$ is an overall micromechanically averaged compliance tensor, $f^\alpha$ is a volume fraction of an inclusion phase, $C^\alpha$ is an elasticity of the inclusion phase, and $\overline{S}^\alpha$ is an elasticity of the Eshelby inclusion plane.

12. The method of claim 11, wherein the elastic properties in the continuum micromechanical elastic properties modeling are imported from experimentally proven values.

13. The method of claim 11, wherein the initial assumption $\overline{C}^0 = C(\mu, v)$ and $\overline{S}^0 = S(v)$, where $\mu$, $v$ are elastic constants.

14. The method of claim 11, wherein performing continuum micromechanical elastic properties modeling is terminated when norm($\overline{C}^{n+1} - \overline{C}^n$) is smaller than a predetermined critical value.

15. A method of deriving continuous mechanical properties, said method comprising:

obtaining mineralogy data from drill cuttings from a wellbore using x-ray diffraction (XRD), wherein said mineralogy data comprises composition and texture parameters by depth, constituent type, volume fraction of constituents, porosity, shape factor, and elastic parameters including Young's modulus, Poisson's ratio, bulk modulus, and Lame's constants;

compiling said mineralogy data by volume fraction and designating at least two of said elastic parameters;

inverting said elastic parameters into a compliance tensor;

converting said shape factor into Eshelby shape tensors;

performing continuum micromechanical elastic properties modeling iteratively on the Eshelby shape tensors using Eshelby's inclusion method for heterogeneous composite materials;

calculating an overall micro-mechanically averaged compliance tensor based on the continuum micromechanical elastic properties modeling; and displaying results as at least one of (1) continuous plots of the overall micro-mechanically averaged compliance vs. depth, (2) conceptual testing of an effect of changing the volume fraction of constituents, or (3) ternary plots of volume fraction and elastic properties, wherein the Eshelby's tensor is represented by the following matrix:

wherein a1, a2, a3 are semi-axes and a1>a2>a3; Q and R are constant where Q=3/8π(1−v) and R=(1−2v)/8π(1−v); the I terms are $$I_1 = \frac{4\pi a_1 a_2 a_3}{(a_1^2 - a_2^2)\sqrt{a_1^2 - a_3^2}} \left[ \int_0^\theta \frac{1}{\sqrt{1 - k^2 \sin^2 \xi}} d\xi - \int_0^\theta \sqrt{1 - k^2 \sin^2 \xi}\, d\xi \right]$$

$$I_3 = \frac{4\pi a_1 a_2 a_3}{(a_2^2 - a_3^2)\sqrt{a_1^2 - a_3^2}} \left[ \frac{a_2 \sqrt{a_1^2 - a_3^2}}{a_1 a_3} - \int_0^\theta \sqrt{1 - k^2 \sin^2 \xi}\, d\xi \right]$$

$$I_2 = 4\pi - I_1 - I_3$$

$$I_{ij} = \frac{I_i - I_j}{3(a_i^2 - a_j^2)}, i \neq j$$

$$I_{ii} = \frac{4\pi}{3a_i^2} - I_{ij} - I_{ik}, i \neq j \neq k$$

wherein the parameter θ and k are represented as $$\theta = \sin^{-1} \sqrt{1 - \frac{a_3^2}{a_1^2}}, k = \sqrt{\frac{a_1^2 - a_2^2}{a_1^2 - a_3^2}}.$$

16. The method of claim 15, further comprising sorting said mineralogy data according to the volume fraction.

17. The method of claim 15, further comprising calibrating said compliance tensor using at least one of the following steps:

i) substituting said elastic parameters with a field-tested value and/or experimentally derived values from literature;

ii) grouping mechanically similar constituents in said mineralogy data;

iii) separating mechanically dissimilar constituents in said mineralogy data;

iv) comparing the overall micro-mechanically averaged compliance tensor with laboratory data;

v) plotting curves according to the overall micro-mechanically averaged compliance tensor and iteratively adjusting unknown parameters to match predicted curves to one or more control points; and vi) interpreting discrepancies between the overall micromechanically averaged compliance tensor and one or more control points.

18. The method of claim 15, wherein the elastic properties in the continuum micromechanical elastic properties modeling are imported from experimentally proven values.

19. The method of claim 15, wherein performing continuum micromechanical elastic properties modeling is terminated when norm($\overline{C}^{n+1}-\overline{C}^n$) is smaller than a predetermined critical value.

20. The method of claim 15, wherein performing continuum micromechanical elastic properties modeling is performed for more than 3 iterations and fewer than 8 iterations.

* * * * *